United States Patent [19]

Price et al.

[11] Patent Number: 4,994,794
[45] Date of Patent: Feb. 19, 1991

[54] METHODS AND APPARATUS FOR DISPLAYING DATA

[75] Inventors: Donald R. C. Price, Maidstone; Colin J. Tredwell, Rainham, both of England

[73] Assignee: GEC-Marconi Limited, England

[21] Appl. No.: 209,538

[22] Filed: Jun. 21, 1988

[30] Foreign Application Priority Data

Jun. 29, 1987 [GB] United Kingdom ............... 8715184

[51] Int. Cl.$^5$ .................................... G09G 3/02
[52] U.S. Cl. .................................... 340/705; 340/980; 358/88
[58] Field of Search ............... 340/705, 980; 358/88, 358/103, 109, 250; 350/130, 171, 174; 353/13, 14

[56] References Cited

U.S. PATENT DOCUMENTS

| | | | |
|---|---|---|---|
| 3,833,300 | 9/1974 | Rymes | 356/13 |
| 4,202,039 | 5/1980 | Glaser et al. | 340/705 |
| 4,390,861 | 6/1983 | Cohen et al. | 340/705 |
| 4,575,722 | 3/1986 | Anderson | 340/705 |
| 4,649,504 | 3/1987 | Krouglicof et al. | 340/705 |

OTHER PUBLICATIONS

Fisher et al.—"Virtual Environment Display System"—Oct. 23 & 24/1986—Aerospace Human Factors Research Division, NASA Ames Research Center—pp. 1-11.

Primary Examiner—Alvin E. Oberley
Assistant Examiner—M. Fatahiyar
Attorney, Agent, or Firm—Kirschstein, Ottinger, Israel & Schiffmiller

[57] ABSTRACT

A data display method and apparatus for use in a vehicle, e.g. for use by the pilot of an aircraft, wherein each eye (EL, ER) of the user (23) is presented with a virtual image at infinity of a respective one of two largely identical displays (31L, 31R). By arranging for corresponding elements (33) of the two displays representative of a controller in the vehicle at a position accessible to the user to have a transverse positional disparity the virtual images of the corresponding elements appear to the user to fuse together to form a single image (I2) in a plane of the controller at a finite distance from the user within the vehicle thereby to facilitate operation of the controller by the user. Other corresponding elements (41, 43, 45, 47, 49) of the two displays (31L, 31R) will normally have no such positional disparity so that their virtual images fuse to present an image (I1) at infinity as in known binocular head-up display (HUD) systems. An aircraft pilot using a binocular HUD system is presented with an image of a control panel (37) in the aircraft to facilitate operation of the panel while using the HUD system.

12 Claims, 2 Drawing Sheets

METHODS AND APPARATUS FOR DISPLAYING DATA

BACKGROUND OF THE INVENTION

1. Field of the Invention

This invention relates to methods and apparatus for displaying data.

More particularly, the invention relates to methods and apparatus for displaying data using a binocular head-up display system.

2. Description of Related Art

By a binocular head-up display system is meant a display system comprising: a pair of combiner means disposed in spaced relationship so as each to lie, in use of the system, on the line of sight of a respective one of the eyes of a user of the system; a pair of projector means, one for each combiner means, each arranged to project light from a display surface onto the associated combiner for reflection thereby to provide the associated eye of the user with a virtual image at infinity of a display on the display surface superimposed on the user's view through the combiner; and signal generating means operable to supply to the projector means signals to produce displays on said display surfaces.

Such a display system finds particular application in vehicles, especially aircraft, for providing the user with a display of data needed to operate the vehicle whilst viewing the scene external of the vehicle.

SUMMARY OF THE INVENTION

It is an object of the present invention to provide a method and apparatus for displaying data using a binocular head-up display system wherein the capability of the system to display data is enhanced.

According to a first aspect of the present invention there is provided a method for displaying data using a binocular head-up display system as hereinbefore defined wherein said signal generating means is controlled so that at least one display element appears identically at both said display surfaces though with a transverse positional disparity of the element at one display surface as compared to the element at the other, with the result that whilst virtual images of the two elements viewed separately via the combiners each appear congruent with the plane at infinity, the stereoscopic effect created by the transverse positional disparity between the said virtual images, being a disparity resulting from said disparity of the two elements at the display surfaces, gives rise seemingly to a fused single virtual image seemingly congruent with a plane at a finite distance from the eyes of a user of the system, said distance being determined by the magnitude of said disparity at said display surfaces.

In a method according to the invention said signal generating means is preferably further controlled so that at least one further display element appears identically at both said display surfaces without a transverse positional disparity of the further element at one display surface as compared to the further element at the other, with the result that, there being no positional disparity at the display surfaces between the two further display elements, no positional disparity exists between the virtual images thereof viewed separately via the combiners and the stereoscopic effect created by the absence of transverse positional disparity between the virtual images of the two further elements gives rise seemingly to a fused single virtual image seemingly congruent with a plane at an infinite distance from the eyes of a user of the system.

Where the method is employed in relation to a display system in a vehicle, for example an aircraft, the disparity of the two first-mentioned display elements is typically such that the plane seemingly congruent width the seemingly fused single virtual image thereof is within the said vehicle.

In such a method said first-mentioned display elements may be representative of a keyboard in the vehicle at a position accessible to a user of the binocular system. The keyboard may be in the nature of a so-called soft keyboard and said first mentioned display elements may be in the nature of a keyboard representation and may then include representations of keyboard functions or other data relevant to an operational mode of the keyboard.

Such a method may further include sensing the proximity of a manually movable pointer, for example a finger of the said user, with respect to said keyboard and further controlling said signal generating means to present display elements at said display surfaces such as to give rise to a fused single virtual image representing said pointer seemingly adjacent to the plane of the keyboard representation virtual image.

BRIEF DESCRIPTION OF THE DRAWINGS

The invention also provides apparatus for carrying out the method according to the invention.

One method and apparatus for displaying data according to the invention will now be described, by way of example, with reference to the accompanying drawings, in which.

DETAILED DESCRIPTION OF THE PREFERRED EMBODIMENTS

Figure 1:
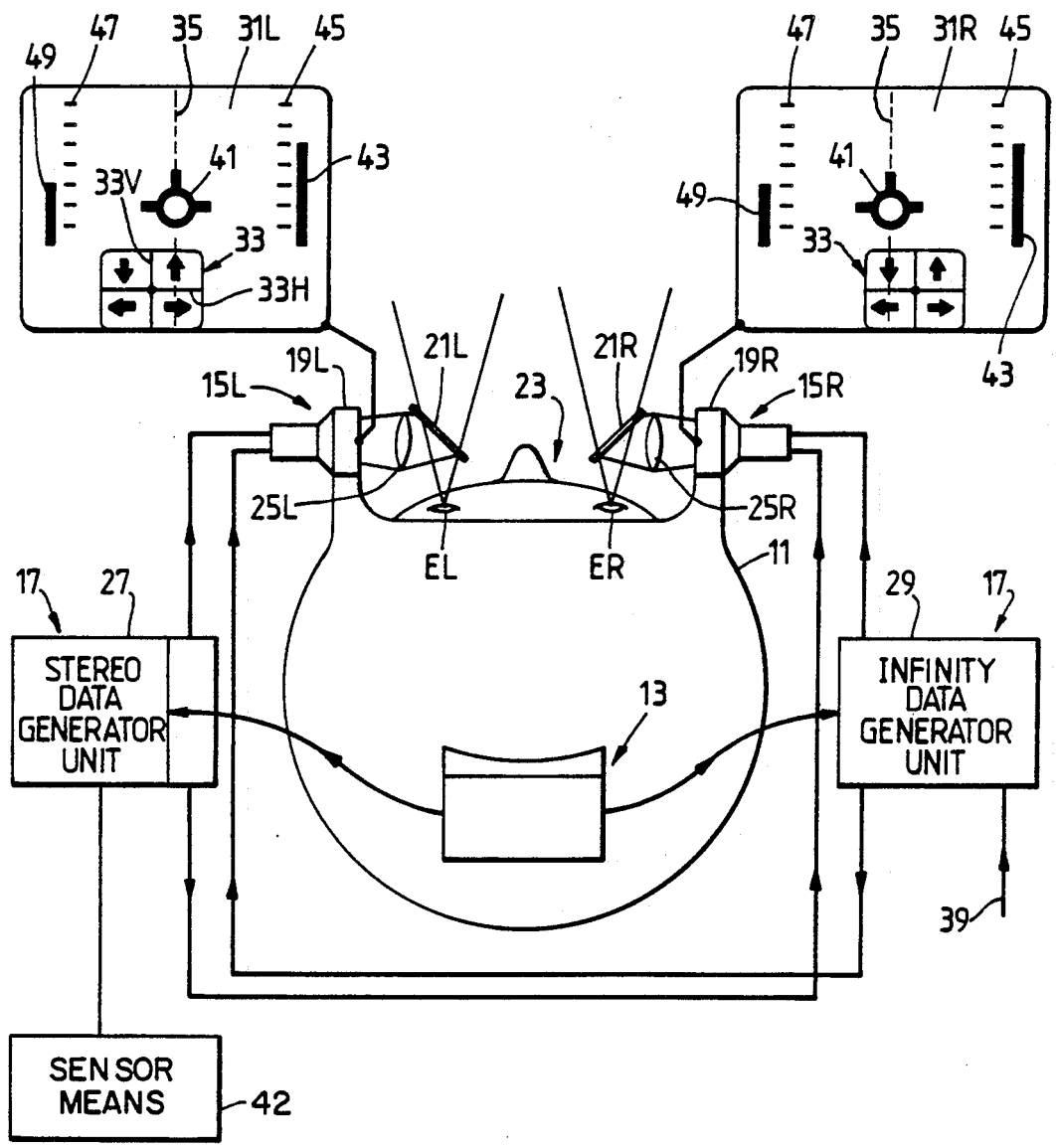
FIG. 1 is a diagrammatic and stylised representation of the apparatus.

Referring to FIG. 1 of the drawings, the apparatus is suitable for use in an aircraft and comprises a binocular head-up display system, partly mounted on a helmet 11, and a helmet angular position sensor system 13.

The head-up display system comprises two helmet mounted projector units 15L, 15R, two image combiners 21L, 21R and a signal generator means 17.

Each of the combiners 21L, 21R comprises a semi-silvered plain mirror mounted on the helmet 11 so as to intercept the forward line of sight from a respective one of the eyes EL, ER of the helmet wearer 23; a cathode ray tube 19L or 19R, and between the screen 31L or 31R of the cathode ray tube 19L or 19R and a respective one of the combiners 21L, 21R, a collimating optical sub-system represented, for simplicity, by lens 25L or 25R.

The projector units 15L, 15R and combiners 21L, 21R are positioned so that light from the screen 31L or 31R of each cathode ray tube 19L or 19R, after collimation by the associated lens 25L or 25R, is reflected at the associated combiner 21L or 21R to a respective eye EL or ER of the helmet wearer 23, thereby to superimpose a virtual image at infinity of a display on the screen 31L or 31R on the user's view through the combiner 21L or 21R.

The helmet angular position sensor system 13 may be of the Polhemus type but other helmet angular position sensor systems employing, for example, optical principles may be used. One example of such an optical system for measuring helmet angular position is described in GB-A-1,138,851.

The sensor system 13 provides outputs which are applied to the signal generator means 17 so as to control, in so far as is appropriate, the displays on the cathode ray tubes screens 31L and 31R in dependence on the viewing direction of the helmet wearer 23 e.g. in so far as the displays may depict real world features.

The signal generator means 17 is, for purposes of explanation, shown to comprise a so-called stereo data generator unit 27 and a so-called infinity data generator unit 29. In practice, however, the units 27 and 29 may be elements of integrated digital processor means dependent upon inputs from aircraft instruments such, for example, as gyros and air data computers as well as manual switch operation to develop outputs for controlling bright up circuits (not shown) associated with the cathode ray tubes 19L, 19R.

Collimation being effected entirely, in the exemplary arrangement depicted, by optical sub-systems 21L, 21R, the latter necessarily have principal focal planes respectively congruent with the screens 31L, 31R of the cathode ray tubes 19L, 19R.

As indicated above, bright data display elements at the two cathode ray tube screens 31L, 31R give rise to virtual images which, viewed separately through the respective image combiners 21L, 21R, are each, seemingly, congruent with the plane at infinity in the helmet wearer's viewing direction.

Signals from the infinity data generator unit 29 control the bright up circuits of each of the cathode ray tubes 19L, 19R, identically, the corresponding bright data display elements at the screens 31L, 31R being therefore substantially identical in all respects. The corresponding virtual images at infinity viewed through the image combiners 21L, 21R, appear to the user of the binocular display system as a mentally fused single virtual image as a result of the identicality of the bright data displays elements both in form and position at the cathode ray tube screens 31L, 31R and the consequent identicality both as regards form and position of the virtual images thereof. Infinity data is represented by identical bright data symbols 41, 43, 45, 47 and 49 on the screens 31L, 31R of the cathode ray tubes 19L, 19R.

Figure 2:
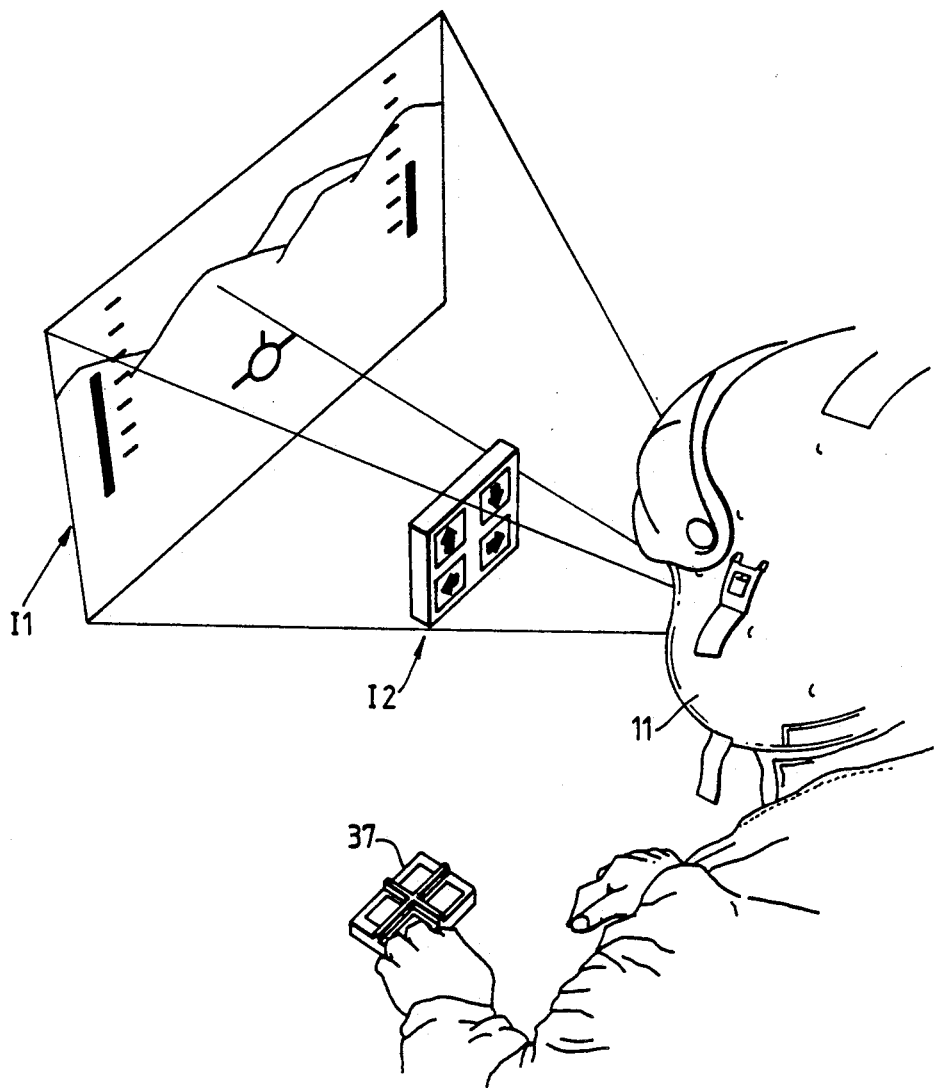
FIG. 2 is a perspective diagram intended to facilitate an understanding of a stereoscopic effect obtained in use of the apparatus.

FIG. 2 depicts a representation of the mentally fused single virtual image I1 notionally at infinity, of the two virtual images of the identical bright data display element patterns produced at the screens 31L, 31R in response to signals from the infinity data generator unit 29.

Bright data display elements produced at the two cathode ray screens 31L, 31R in response to signals from the stereo data signal generator unit 27 differ from those produced by the infinity data signal generator unit 29 in that the bright data display elements at the screens 31L, 31R whilst being identical as to form, exhibit a positional disparity at one screen 31L as compared with the other screen 31R.

In FIG. 1 the bright data display element 33 produced at each cathode ray tube screen 31L or 31R in response to signals from the stereo data signal generator unit 27 is represented as being in the form of a panel 33 having crossed lines 33V, 33H, dividing the panel into quadrants each containing, typically, an arrow as illustrated.

The positional disparity of the bright data display elements 33 is shown in the example as an outwards displacement with respect to the cathode ray tube face vertical center line 35. Collimated rays from such outwardly displaced bright data display elements 33 received by the helmet wearer give rise to virtual images which appear to be inwardly displaced in the fields of view through the image combiners 21L, 21R, as a result of reflections of the collimated rays at the combiners.

The virtual images of such displaced bright data display elements appear to the helmet wearer as a fused single image congruent with a plane at a finite distance in the viewing direction as a result of the stereoscopic effect, even though the individual virtual images of the panel 33 are, viewed separately, each seemingly congruent with the plane at infinity, all bright data display elements at the screens 31L, 31R of the cathode ray tubes 19L, 19R being necesarily in the principal focal plane of one or other of the collimating sub-systems of the binocular system.

The stereoscopically fused single virtual image I2 of the panels 33, is clearly distinguishable from the fused single virtual image I1 at infinity, lying, as the virtual image I2 apparently does, in a plane parallel to the plane at infinity but at a finite distance from the helmet wearer 23.

It will be appreciated that the magnitude of the apparent finite distance of the image I2 from the helmet wearer 23 varies with the magnitude of the positional disparity of the elements of the displays at the screens 31L, 31R corresponding to the image I2.

The stereoscopically fused single virtual image I2 of the panel 33 corresponds to an actual panel of a so-called soft keyboard 37, situated in the aircraft at a position accessible to the helmet wearer 23.

The functions of the soft keyboard 37 necessarily depend on the system operational mode of the keyboard. In the described embodiment the operational mode involves the display of arrow representations at the cathode ray tube screens 31L and 31R and, accordingly at the stereoscopically fused virtual image I2 thereof. Touching the soft keyboard 37 produces corresponding changes, in the directions indicated by the arrows, in the positions of corresponding elements in the displays at the cathode ray tube screens 31L, 31R e.g. in the positions of the cursor symbols 41, in relation to other parts of the displays, and consequently a change in the position of the part of the fused virtual image I1 corresponding to the symbol 41 in relation to other parts of the fused virtual image I1.

Sensor means 42 may be provided, operative to sense the proximity of, say, a finger to an operating element of the soft keyboard 37, and a bright data display element representing a corresponding pointer may be presented and caused to move on the cathode ray tube screens 31L and 31R and, accordingly, in the stereoscopic fused virtual image in sympathy with the movement of the finger.

The fused virtual image II at infinity may include not only symbols such as 41, 43, 45, 47, 49, but also a representation of the forward scene itself. The forward scene representation may be produced in response to infrared, low light television, or radar returns, applied to an input 39 of the infinity data generator 29, the forward scene represented by such signals being presented at the cathode ray tube screens 31L and 31R together with the symbols.

The aircraft cockpit may be equipped with means for protecting the helmet wearer 23, and particularly the helmet wearer's eyes, against laser damage and, when employing such means, the helmet wearer 23, not having a direct view of the forward scene, must necessarily rely on bright data presented at the cathode ray tube screens 31L and 31R in response to returns, as aforesaid, from infra-red low light television or radar carried by the aircraft.

In the foregoing example one stereoscopically fused single virtual image I2 only congruent with a plane at a finite distance from the helmet wearer 23 is described.

It will however be appreciated that in other arrangements according to the invention two or more pairs of bright data display elements each with a different positional disparity may be presented at the screens 31L and 31R of the two cathode ray tubes 19L, 19R, each of which pairs will give rise to a respective corresponding stereoscopically fused virtual image seemingly congruent with a plane at a different finite distance from the helmet wearer 23 in the forward viewing direction.

We claim:

1. A method of displaying data in a vehicle using a head-up display system which includes a pair of combiner means disposed in spaced relationship so as each to lie, in sue of the system, on the line of sight of a respective one of the eyes of a user of the system; a pair of projector means, one for each combiner means, each arranged to project light from a display surface onto the associated combiner for reflection thereby to provide the associated eye of the user with a virtual image at infinity of a display on the display surface superimposed on the user's view through the combiner; and signal generating means operable to supply to the pair of projector means signals to produce displays on said display surfaces; the method comprising the step of: controlling said signal generating means so that at least one display element representative of a control means in the vehicle indicating a position of relative location the control means in the vehicle which is accessible to the user appears identically at both said display surfaces though with a transverse positional disparity of the element at one display surface as compared to the element at the other, with the result that while virtual images of the two elements viewed separately via the combiners each appear congruent with the plane at infinity, the stereoscopic effect created by the transverse positional disparity between he said virtual images, being a disparity resulting from said disparity of the two elements at the display surfaces, gives rise seemingly to a fused single virtual image representative of said control means seemingly congruent with a plane at a finite distance from the eyes of a suer of the system at said position within the vehicle such as to facilitate operation of the control means by the user, said distance being determined by the magnitude of said disparity at said display surfaces.

2. A method according to claim 1 wherein said signal generating means is further controlled so that at least one further display element appears identically at both said display surfaces without a transverse positional disparity of the further element at one display surface as compared to the further element at the other, with the result that, there being no positional disparity at the display surfaces between the two further display elements, no positional disparity exists between he virtual images thereof viewed separately via the combiners and the stereoscopic effect created by the absence of transverse positional disparity between the virtual images of the two further elements gives rise seemingly to a fused single virtual image seemingly congruent with a plane at an infinite distance from the eyes of a user of the system.

3. A method according to claim 1 wherein said two display elements are representative of a keyboard in the vehicle at a position accessible to a user of the head-up display system.

4. A method according to claim 3 wherein said keyboard is a so-called soft keyboard and said two display elements are in the nature of keyboard representations and include representations of keyboard functions or other data relevant to an operational mode of the keyboard.

5. A method according to claim 4 further including sensing the proximity of a pointer with respect to said keyboard and further controlling said signal generating means to present display elements at said display surfaces such as to give rise to a fused single virtual image representing said pointer seemingly adjacent to the plane of the keyboard representation virtual image.

6. An apparatus for displaying data in a vehicle comprising: a head-up display system comprising; a pair of combiner means disposed in spaced relationship so as each to lie, in use of the system, on the line of sight of a respective one of the eyes of a user of the system; a pair of projector means, one for each combiner means, each arranged to project light from a display surface onto the associated combiner for reflection thereby to provide the associated eye of the user with a virtual image at infinity of a display on the display surface superimposed on the user's view through the combiner; and signal generating means operable to supply to the pair of projector means signals to produce displays on said display surfaces; and means for controlling said signal generating means so that at least one display element representative of a control means int he vehicle indicating a position of relative location of the control means in the vehicle which is accessible to the user appears identically at both said display surfaces though with a transverse positional disparity of the element at one display surface as compared to the element at the other, with the result that while virtual images of the two elements viewed separately via the combiners each appear congruent with the plane at infinity, the stereoscopic effect created by the transverse positional disparity between the said virtual images, being a disparity resulting from said disparity of the two elements at the display surfaces, gives rise seemingly to a fused single virtual image representative of said control means seemingly congruent with a plane at a finite distance from the eyes of a user of the system at said position within the vehicle such as to facilitate operation of the control means by the user, said distance being a function of the magnitude of said disparity at said display surfaces.

7. An apparatus according to claim 6 wherein said means for controlling further controls said signal generating means so that at least one further display element appears identically at both said display surfaces without a transverse positional disparity of the further element at one display surface as compared to the further element at the other, with the result that, there being no positional disparity at the display surfaces between the two further display elements, no positional disparity exists between the virtual images thereof viewed separately via the combiners and the stereoscopic effect created by the absence of transverse positional disparity between the virtual images of the two further elements gives rise seemingly to a fused single virtual image seemingly congruent with a plane at an infinite distance from the eyes of a user of the system.

8. An apparatus according to claim 6 wherein said two display elements are representative of a keyboard in the vehicle at a position accessible to a user of the head-up display system.

9. An apparatus according to claim 8 wherein said keyboard is a so-called soft keyboard and said two display elements are in the nature of keyboard representations and include representations of keyboard functions or other data relevant to an operational mode of the keyboard.

10. An apparatus according to claim 8 further including means for sensing the proximity of a pointer with respect to said keyboard and said means for controlling further controls said signal generating means to present display elements at said display surfaces such as to give rise to a fused single virtual image representing said pointer seemingly adjacent to the plane of the keyboard representation virtual image.

11. An apparatus according to claim 6 wherein said combiners and projector units of said head-up display system are mounted on a helmet for wear by a user of the apparatus.

12. An apparatus according to claim 11 further including means for producing an output representative of the angular position of the helmet, and hence the viewing direction of a wearer of the helmet, and means for applying said output to said signal generating means to control the displays on said display surfaces in dependence on said viewing direction.

* * * * *